United States Patent
Gehringer et al.

(10) Patent No.: US 10,265,897 B2
(45) Date of Patent: Apr. 23, 2019

(54) CAP FOR CLOSING A CONTAINER COMPRISING A NECK DELIMITING AN OPENING AND METHOD FOR MANUFACTURING THE SAME

(71) Applicant: SOCIETE ANONYME DES EAUX MINERALES D'EVIAN "S.A.E.M.E.", Evian-les-Bains (FR)

(72) Inventors: Christine Gehringer, Vinzier (FR); Michel Roussy, Lugrin (FR)

(73) Assignee: SOCIETE ANONYME DES EAUX MINERALES D'EVIAN et en abrégé "S.A.M.E", Evian-les-Bains (FR)

( * ) Notice: Subject to any disclaimer, the term of this patent is extended or adjusted under 35 U.S.C. 154(b) by 659 days.

(21) Appl. No.: 14/758,600

(22) PCT Filed: Dec. 31, 2012

(86) PCT No.: PCT/EP2012/077116
§ 371 (c)(1),
(2) Date: Jun. 30, 2015

(87) PCT Pub. No.: WO2014/101973
PCT Pub. Date: Jul. 3, 2014

(65) Prior Publication Data
US 2015/0336716 A1  Nov. 26, 2015

(51) Int. Cl.
*B29C 45/00* (2006.01)
*B29C 45/16* (2006.01)
(Continued)

(52) U.S. Cl.
CPC ...... *B29C 45/1676* (2013.01); *B65D 41/0471* (2013.01); *B65D 41/0485* (2013.01);
(Continued)

(58) Field of Classification Search
CPC ............ B29C 45/1676; B29C 45/2708; B65D 41/0471; B65D 14/0485; B65D 41/3423;
(Continued)

(56) References Cited

U.S. PATENT DOCUMENTS 2,074,830 A  3/1937  Conner
2,394,135 A  2/1946  Baar
(Continued)

FOREIGN PATENT DOCUMENTS

DE   10 2008 010085   8/2009
WO   2006/076747      7/2006
WO   2008/030400      3/2008

*Primary Examiner* — Ernesto Grano
(74) *Attorney, Agent, or Firm* — Clark & Brody

(57) ABSTRACT

Cap (1) for closing a container comprising a neck delimiting an opening, said cap (1) extending along a central axis (A) and comprising:
 a body part (2) molded from a thermoplastic material and including a top wall (5) and a skirt (15),
 a grip part (30) overmolded at least partly around the central axis (A), onto a part of the body part (2), from a thermoplastic elastomer (TPE) which is softer than the thermoplastic material of the body part (2),
wherein the grip part (30) is overmolded only onto a part of an outer surface (18) of the skirt (15), the grip portion being delimited along the central axis (A) by a top edge (32) arranged at a distance from the top wall (5), and a bottom edge (31) spaced apart from the top edge (32) towards a free end (16) of the skirt (15).

17 Claims, 3 Drawing Sheets

Figure 1:
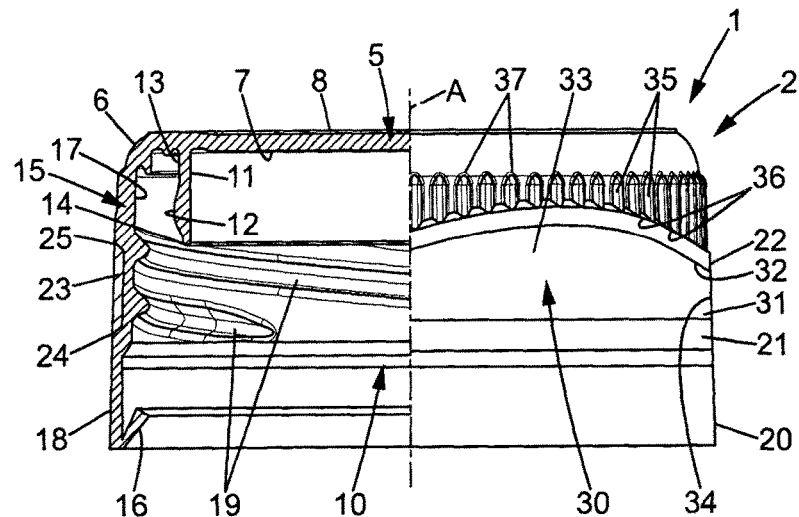

(51) Int. Cl.
  *B65D 41/04* (2006.01)
  *B65D 41/34* (2006.01)
  *B29K 21/00* (2006.01)
  *B29K 101/12* (2006.01)
  *B29C 45/27* (2006.01)
  *B29L 31/56* (2006.01)

(52) U.S. Cl.
  CPC ...... *B65D 41/3423* (2013.01); *B29C 45/2708* (2013.01); *B29K 2021/003* (2013.01); *B29K 2101/12* (2013.01); *B29K 2995/007* (2013.01); *B29L 2031/565* (2013.01); *B65D 2251/023* (2013.01); *B65D 2251/026* (2013.01)

(58) Field of Classification Search
  CPC ........ B65D 2251/026; B29K 2995/007; B29K 2101/12; B29K 2021/003; B29L 2031/565
  USPC ......................................................... 215/316
  See application file for complete search history.

(56) References Cited

U.S. PATENT DOCUMENTS

| | | | | |
|---|---|---|---|---|
| 4,702,384 A * | 10/1987 | Weiser | ............... | B65D 41/0464 215/295 |
| 5,443,172 A * | 8/1995 | Gabriele | ............ | B65D 41/0485 215/295 |
| 6,481,589 B2 * | 11/2002 | Blomdahl | .......... | B65D 41/0485 215/303 |
| 7,007,817 B2 * | 3/2006 | Jochem | ............... | B29C 37/0085 215/305 |
| 7,097,790 B2 * | 8/2006 | Jochem | ............... | B29C 37/0085 264/148 |
| D586,213 S * | 2/2009 | Wells | ............................. | D9/453 |
| 8,109,396 B1 * | 2/2012 | Robinson | ............ | B65D 41/0485 215/220 |
| 8,231,020 B2 * | 7/2012 | Taber | .................... | B65D 41/04 215/228 |
| 8,695,821 B2 * | 4/2014 | Bashyam | ............ | B65D 41/0485 215/252 |
| D755,633 S * | 5/2016 | Baughman | ..................... | D9/452 |
| 9,650,179 B2 * | 5/2017 | Sheikh | .................. | B65D 33/16 |
| 2002/0113032 A1 | 8/2002 | Blomdahl et al. | | |
| 2005/0061766 A1 * | 3/2005 | Jochem | ............... | B29C 37/0085 215/305 |
| 2005/0062183 A1 * | 3/2005 | Jochem | ............... | B29C 37/0085 264/40.4 |
| 2005/0145593 A1 | 7/2005 | Simone et al. | | |
| 2008/0197101 A1 * | 8/2008 | Rapoport | ............... | B65D 41/045 215/252 |
| 2008/0302753 A1 * | 12/2008 | Jochem | ................... | B29C 43/18 215/228 |
| 2009/0084753 A1 * | 4/2009 | Ramos | ............... | B29C 45/1418 215/346 |
| 2009/0212003 A1 * | 8/2009 | Gudmundsson | ... | B65D 51/2864 215/329 |
| 2011/0220607 A1 | 9/2011 | Mukunoki | | |

* cited by examiner

CAP FOR CLOSING A CONTAINER COMPRISING A NECK DELIMITING AN OPENING AND METHOD FOR MANUFACTURING THE SAME

The invention relates to a cap for closing a container comprising a neck delimiting an opening and to a method for manufacturing the same.

In particular, the invention relates to a cap of the type extending along a central axis and comprising:

- a body part molded from a thermoplastic material, such as a polyolefine, preferably a polyethylene (PE) or a polypropylene (PP), more preferably from high density polyethylene (HDPE), said body part including a top wall transverse to the central axis, and a skirt extending around the central axis from the top wall towards a free end, said skirt having an inner surface defining a housing for accommodating the neck of the container, and an outer surface opposite to the inner surface,
- a grip part overmolded at least partly around the central axis, onto a part of the body part, from a thermoplastic elastomer (TPE), said thermoplastic elastomer being softer than the thermoplastic material of the body part.

A known cap of this type is especially disclosed in EP 1 361 982.

The grip part of the known cap comprises enlarged portions extending from the top wall of the body part. The grip part is then arranged onto a corner of the body part between two substantially perpendicular surfaces of the top wall and the skirt.

However, the thermoplastic elastomer of which the grip part is made can hardly be evenly overmolded on the corner of the body part, especially when the shape of the grip part is to be varied. The known arrangement of the grip part results in deterioration of the appearance of the cap and reduction of the adaptability of the grip part. Besides, the known arrangement of the grip part does not help in providing an efficient grasping of the cap by a user.

The invention aims at solving the above mentioned problems.

To this end, according to a first aspect, the invention provides a cap of the aforementioned type wherein the grip part is overmolded only onto a part of the outer surface of the skirt, the grip part being delimited along the central axis by a top edge arranged at a distance from the top wall, and a bottom edge spaced apart from the top edge towards the free end of the skirt.

Hence, the grip part arranged only on the outer surface of the skirt can easily be overmolded to provide an improved appearance to the cap. It can further be easily designed into different shapes covering more or less desired parts of the outer surface of the skirt, thereby improving the adaptability of the grip part. Besides, the arrangement of the grip part on the outer surface of the skirt which better suits the physiological grasping of the cap between the tips of the user's fingers provides an improved grasping, without hurting the fingers, as the striae usually present on the skirt of the thermoplastic caps could do.

According to noteworthy feature of the invention, the raw material of the grip, i.e the TPE, has Shore A hardness preferably lower or equal to 65, more preferably comprised between 35 and 60, and still more preferably between 45 and 55.

The TPE can be advantageously chosen among the elastomers which are compatible with the thermoplastic raw material of the body part of the cap. "compatible" refers e.g. to the fact that the TPE should be moldable, and therefore injectable, on the thermoplastic raw material.

The TPE could be for instance from the followings families of products: Styrenic block copolymers; Polyolefin blends; Elastomeric alloys (TPE-v or TPV); Thermoplastic polyurethanes; Thermoplastic copolyesters; Thermoplastic polyamides, Styrenic block copolymers being preferred, and StyreneEthyleneButylStyrene (SEBS) being more particularly preferred.

The outer surface of the skirt may have a periphery about the central axis, the grip part extending on at least 30%, preferably at least 50%, of the periphery of the outer surface of the skirt, more preferably the grip part extending on the whole periphery of the outer surface of the skirt. Herein the periphery is understood as a circle defined by the intersection of the skirt and plan perpendicular to the central axis. Thus a grip part extending on the whole periphery of the outer surface of the skirt has the form of a ring. Similarly a grip part extending on 50% periphery of the outer surface of the skirt has the form of a half ring.

Outstandingly, the surface of the grip part could represent, in an increasing order of preference, between 5 to 90%, 10 to 60%, 20 to 50% of the surface of the skirt.

The grip part can be a regular ring but may also comprise gripping portions equally distributed around the axis.

In particular, the grip part may comprise enlarged portions forming the gripping portions, and narrower portions connecting two adjacent gripping portions, preferably so as to define waves.

For example, the bottom edge of the grip part may be substantially flat and the top edge of the grip part may be curved so as to define the gripping portions extending from the bottom edge, and the narrow portions.

These different possible forms of the grip part could improve the design of the cap.

Advantageously, the grip part could be prominent with respect to the skirt. This prominence can result from the grip part as a whole and/or from the fact that the exterior surface of said grip part comprises some discrete spikes and/or ribs and/or pads. This prominence could improve the grasping of the cap by the fingers for the opening and the closing of the container. Such a prominent (roll molding) embodiment of the grip part is preferred according to the invention.

In an embodiment, the cap further comprises a location member extending on the outer surface of the skirt, parallel to the central axis, from the top edge of one of the narrow portions of the grip part, towards the top wall, the location member being made of the same thermoplastic elastomer as the grip part.

The outer surface of the skirt may have a groove delimited along the central axis by a top side arranged at a distance from the top wall, and a bottom side spaced apart from the top side towards the free end of the skirt, the grip part filling the groove.

It may be interesting that the at least a part of the surface of the groove be treated so as to increase the adhesion of the TPE grip part vis à vis the thermoplastic raw material of the body part of the cap. For instance, this surface treatment can be a rubbing or any suitable treatment for increasing roughness. The treatment may also consist in designing a a sticky interface between the grip part and the groove.

In a preferred embodiment, the grip part is obtained by overmoulding only onto a part of the outer surface of the cap skirt, overmoulding wherein there is (are) only one (or several) injection(s) of the TPE on to the side of the cap. In this embodiment, the grip part on the cap skirt comprises only one (or several) injection(s) point(s).

The cap may further comprise a plurality of ribs extending parallel to the central axis on the outer surface of the skirt, between the top edge of the grip part and the top wall.

Each rib may have a bottom end at the vicinity of the top edge of the grip part, and a top end opposite to the bottom end, the top end being arranged at a distance from the top wall.

The ribs may be integral with the skirt.

In a variant, the ribs may be integral with the grip part.

The bottom edge of the grip part may be spaced apart from the free end of the skirt.

According to a second aspect, the invention concerns a method for manufacturing a cap as defined above, comprising the steps of:
- molding, in a cavity of a mold, the body part from a thermoplastic material, such as polyethylene (PE) or polypropylene (PP), preferably from high density polyethylene (HDPE),
- overmolding, in the cavity of the mold, the grip part at least partly around the central axis, only onto a part of the outer surface of the skirt, from a thermoplastic elastomer (TPE), said thermoplastic elastomer being softer than the thermoplastic material of the body part.

In an embodiment, the step of molding the body part may comprise injecting the thermoplastic material along a frontal axis coaxial to the central axis of the cap, through a frontal nozzle opening in the cavity of the mold, and the step of overmolding the grip part may comprise injecting the thermoplastic elastomer along a lateral axis perpendicular to the frontal axis, through a lateral nozzle opening into the cavity so as to face the outer surface of the skirt.

In another embodiment, the step of molding the body part may comprise injecting the thermoplastic material along a frontal axis coaxial to the central axis of the cap, through a frontal nozzle opening in the cavity of the mold, and the step of overmolding the grip part may comprise injecting the thermoplastic elastomer along a lateral axis parallel to and spaced apart from the frontal axis, through a lateral nozzle opening into the cavity of the mold at the vicinity of (especially, tangentially to) the outer surface of the skirt.

Besides, at the step of molding the body part, the cavity may be provided with molding elements complementary to the grip part, and before the step of overmolding the grip part, the molding elements may be removed from the cavity.

The invention also concerns a container sealed with the cap, preferably filled with a liquid, preferably a beverage, for example water, still or sparkling energy drinks or carbonated drinks such as sodas or colas. In a preferred embodiment the container is a bottle. In a preferred embodiment the bottle is filled with the liquid and sealed with the cap. In this embodiment it is preferred that the cap has a temper proof at the bottom portion of the cap, attached to the cap. The temper proof typically separates from the cap (at the bottom of the skirt) upon opening, leave a ring on the bottle, and a separated cap.

Figure 2:
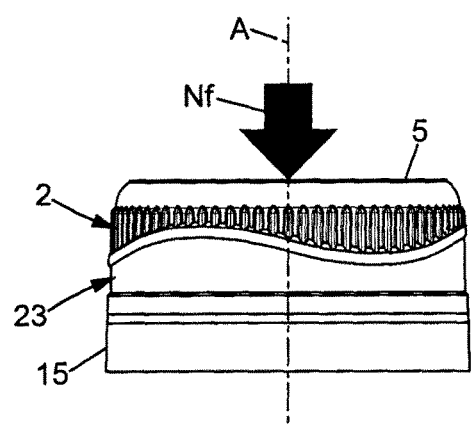
Figure 3:
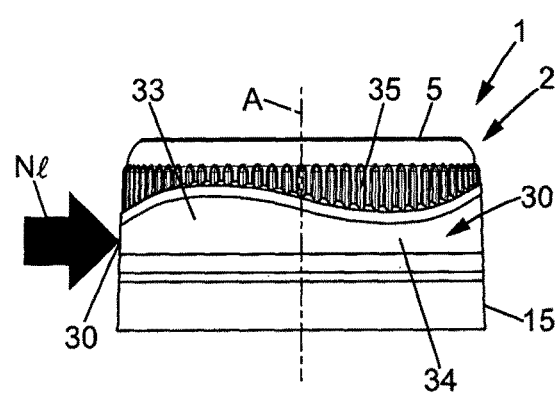
Figure 4:
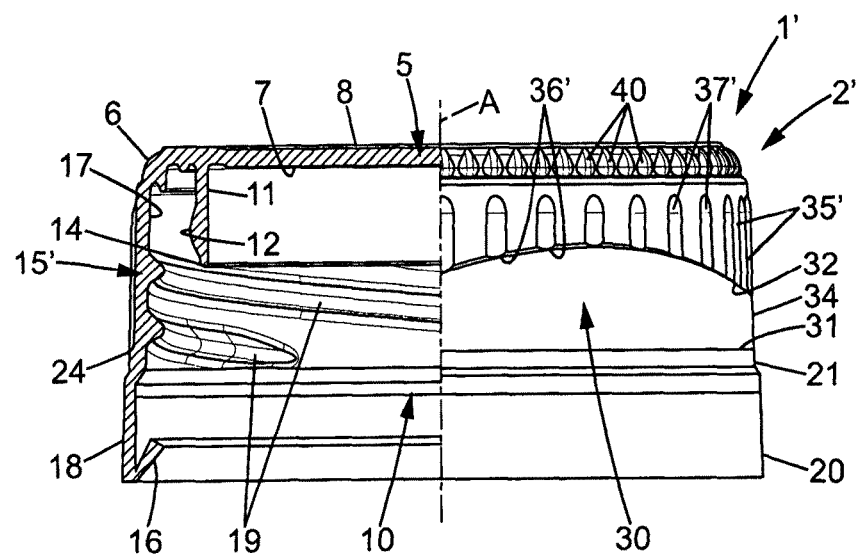
Figure 5:
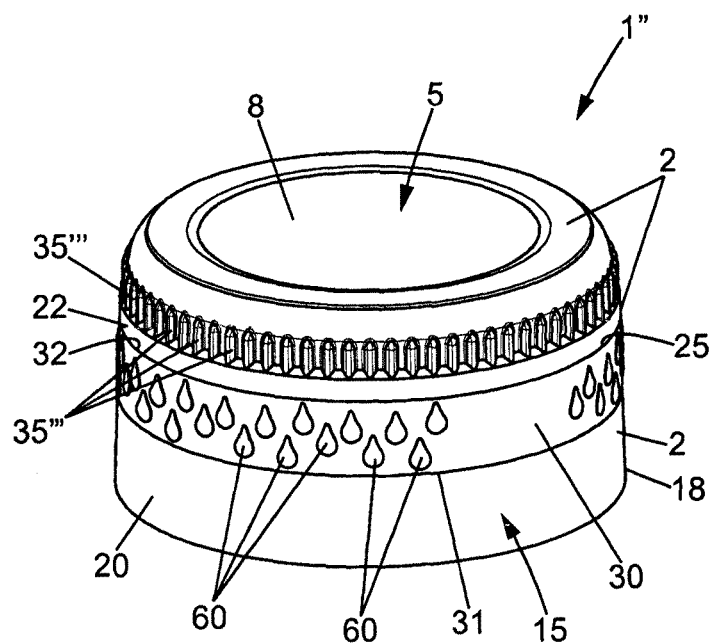
Figure 6:
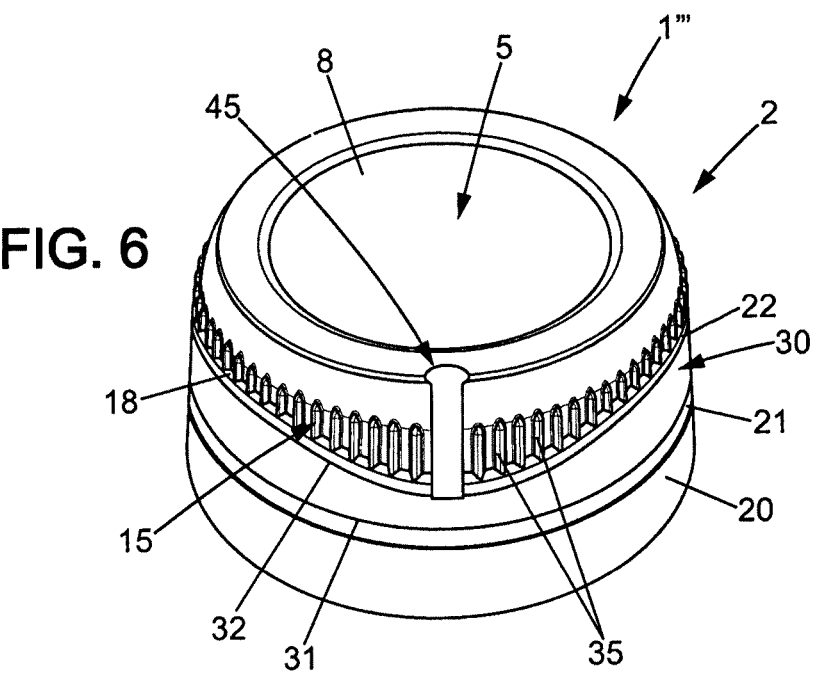
Figure 7:
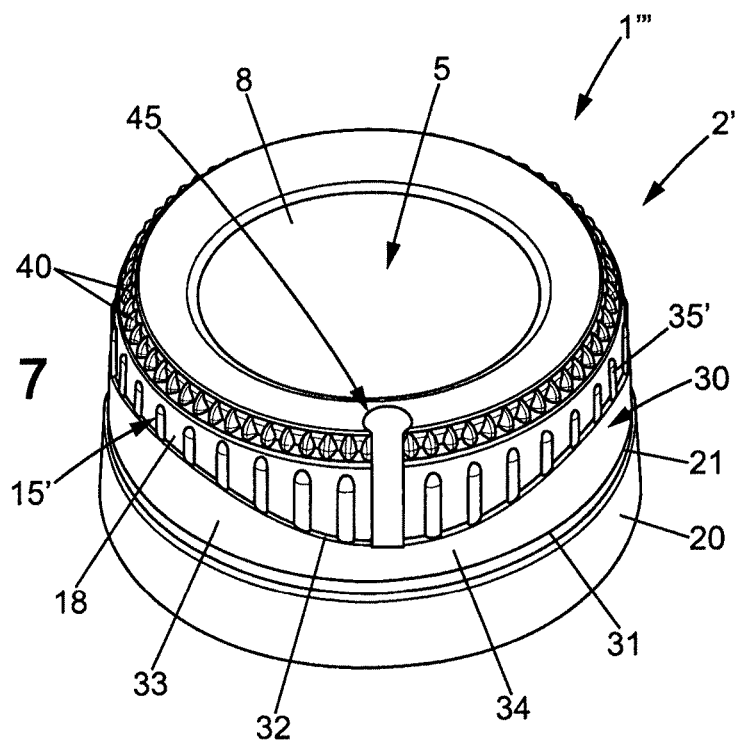

Other objects and advantages of the invention will emerge from the following disclosure of particular embodiments of the invention given as non limitative examples, the disclosure being made in reference to the enclosed drawings in which:

FIG. 1 is a side view in partial longitudinal section of a cap according to a first embodiment of the invention, the cap comprising a molded body part and a grip part overmolded onto a skirt of the body part, FIG. 2 is a schematic representation of a step of molding the body part of the cap of FIG. 1, FIG. 3 is a schematic representation of a step of overmolding the grip part of the cap of FIG. 1, FIG. 4 is a side view in partial longitudinal section of a variant of the cap of FIG. 1, FIG. 5 is a perspective view of a cap according to a second embodiment of the invention, FIG. 6 is a perspective view of a cap according to a third embodiment of the invention, FIG. 7 is a perspective view of a variant of the cap of FIG. 6.

On the Figures, the same reference numbers refer to the same or similar elements.

FIG. 1 represents a first embodiment of a cap 1 for closing the opening of a container, such as a plastic bottle, adapted to receive a product, and especially a liquid product such as water, optionally flavoured and/or carbonated, a soda, a fruit juice, a milk based liquid product or other. The container comprises a neck delimiting the opening for pouring the product.

In the illustrated first embodiment, the cap 1 presents a symmetry of revolution about a central axis A and comprises a body part 2 molded from a thermoplastic material providing, once it has been molded, a global rigidity. The body part is preferably made of high density polyethylene (HDPE) whereas, in other embodiments, it could be made of any other suitable thermoplastic material such as polyethylene (PE) or polypropylene (PP).

The body part 2 includes a top wall 5 extending transversally, and especially in the illustrated first embodiment perpendicular, to the central axis A, and a skirt 15 extending around the central axis A from the top wall 5 to a free end 16. Although not limited thereto, the top wall 5 has a circular outer periphery 6 from which the skirt 15, annular of circular cross-section, extends. The top wall 5 and the skirt 15 have respective inner surfaces 7, 17 defining a housing 10 for accommodating the neck of the container, and respective outer surfaces 8, 18 opposite to the inner surfaces 7, 17.

In the illustrated first embodiment, the inner surface 17 of the skirt 15 is provided with inner threads 19 adapted to cooperate with corresponding outer threads on the neck of the container for attachment of the cap 1 to the neck finish of the container. In other embodiments, the cap 1 could be otherwise attached to the neck finish of the container, such as by force-fitting or snap-fitting.

Also, to provide a tight attachment of the cap 1 to the neck of the container, the top wall 5 has an annular crown 11 extending perpendicular to its inner surface 7 within the housing 10. The crown 11 is arranged at a distance from the inner surface 17 of the skirt 15 such that the neck finish of the container can be received between the inner surface 17 of the skirt 15 and an outer surface 13 of the crown 11, the crown 11 extending within the neck, when the cap 1 is screwed on the neck finish. To improve tightness, an annular bulge 12 is provided on the outer surface 13 of a free end 14 of the crown 11. In other embodiments, a tight attachment of the cap 1 to the neck could be provided in any other suitable manner.

A bottom portion 20 of the skirt 15 comprising the free end 16 is conformed to provide a tamper-evident system. In particular, the free end 16 of the skirt 15 is folded inwardly with respect to the rest of the bottom portion 20 of the skirt 15 to extend within the housing 10, sloping towards the top wall 5. A slitting, consisting in fouling in a plane perpendicular to the central axis a weakened portion connecting the bottom portion 20 of the skirt 15 and a remaining part of the skirt 15, may then be performed to form the bottom portion 20 of the skirt 15 as a tamper-evident band. The weakened portion can for example be a continuous blind slit or discrete through openings. These slits or openings could be obtained by cutting on the molded cap or by several molded bridges joining the bottom portion 20 to the rest of the skirt. In other embodiments, tamper-evident system of any other suitable type could be implemented.

Above the bottom portion 20 of the skirt 15 and, thereby, at a distance from the free end 16 of the skirt 15, the outer surface 18 has an annular bottom bead 21 extending around the central axis A. An annular top bead 22 extending around the central axis A is arranged at a distance along the central axis A from the bottom bead 21, towards the top wall 5. In the illustrated first embodiment, the bottom bead 21 is substantially flat, i.e. extends globally in a plane perpendicular to the central axis A, and the top bead 22 is curved (waves-shaped), i.e. extends on either sides of a median plane perpendicular to the central axis A. In particular, the top bead 22 has a sine-wave form. The bottom 21 and top 22 beads define between them a groove 23 arranged substantially in a central portion of the skirt 15 and delimited along the central axis A by a flat bottom side 24 belonging to the bottom bead 21 and a curved top side 25 belonging to the top bead 22. The groove 23 extends on a whole periphery of the outer surface 18 of the skirt 15 about the central axis A. The groove 23 presents enlarged portions extending from the bottom side 24 and equally distributed around the central axis A, and narrower or narrow portions connecting two adjacent enlarged portions.

According to the invention, a grip part 30 is overmolded only onto a part of the outer surface 18 of the skirt 15 around the central axis 30. The grip part 30 is made from a thermoplastic elastomer (TPE) which is softer than the thermoplastic material of the body part 2 so as to provide better frictional features and better tactile sensations to a user. In a particular non-limitative example, the thermoplastic elastomer is that produced by the company CTS under the trademark Téfabloc® (TO FT 823 75 A for instance). In order to improve the appearance of the cap 1, the thermoplastic elastomer may also have a color different from that of the thermoplastic material of the body part 2. To further improve the appearance of the cap 1, the outer surface 8 of the top wall 5 and/or an outer surface of the grip part 30 could be provided with a pattern, a design and/or an imprint or other.

In the illustrated first embodiment, the grip part 30 fills the groove 23 and has a thickness measured radially with respect to the central axis A corresponding to a depth of the groove 23 measured radially with respect to the central axis A. The outer surface of the grip part 30 is then flush with that of the bottom 21 and top 22 beads. Besides, the grip part 30 thereby extends substantially centrally on the whole periphery of the outer surface 18 of the skirt 15. The grip part 30 is also thereby delimited along the central axis A by:
  a flat bottom edge 31 in contact with the bottom side 24 of the bottom bead 21, the bottom edge 31 of the grip part 30 being spaced apart from the free end 16 of the skirt 15, and
  a curved top edge (wave-shaped) 32 in contact with the top side 25 of the top bead 22, the top edge 32 of the grip part 30 being spaced apart from the top wall 5.

The grip part 30 itself also comprises enlarged portions forming gripping portions 33 extending from the bottom edge 31 and equally distributed around the central axis A, and narrower or narrow portions 34 connecting two adjacent gripping portions 33.

In the first embodiment of FIG. 1, the housing 10 as well as the top wall 5 are deprived of thermoplastic elastomer.

The grip part 30 covers preferably between 10% and 70% of the outer surface of the skirt 15 including the tamper-evident band 20, and between 15% and 90%, especially between 40% and 60%, of the outer surface of the skirt 15 excluding the tamper-evident band 20.

Above the top bead 22 and under the top wall 5, the cap 1 has a plurality of ribs 35 extending parallel to the central axis A and equally distributed on the outer surface 18 of the skirt 15. In the first embodiment, the ribs 35 are integral with the skirt 15 and molded from the same thermoplastic material as that of the body part 2. In particular, each rib 35 has a bottom end 36 connected to the top bead 22, and thereby arranged at the vicinity of the top edge 32 of the grip part 30, and a top end 37 opposite to the bottom end 36. The ribs 35 present different lengths between their bottom 36 and top 37 ends adapted to compensate the curvature (wave-shaped) of the top bead 22. Their top ends 37 can then be arranged in a same plane perpendicular to the central axis A, at a distance from the top wall 5. The ribs 35 also have a thickness, measured radially with respect to the central axis A, corresponding to a thickness, measured radially with respect to the central axis A, of the bottom 21 and top 22 beads. These ribs are intended to facilitate the grasping of the cap 1 by the bottling device on the industrial bottling line.

In relation to FIGS. 2 and 3, a method for manufacturing the above disclosed cap 1 is now disclosed.

For manufacturing the cap 1, a mold having a cavity conformed according to the cap 1 is provided. Molding elements complementary to the grip part 30 can be placed in the cavity so that a remaining space within the cavity is conformed according to the body part 2. The mold comprises:
  at least one frontal nozzle, schematically represented by an arrow Nf on FIG. 2, which opens in the cavity of the mold for molding the body part 2, and
  at least one lateral nozzle, schematically represented by an arrow Nl on FIG. 3, opening into the cavity of the mold for molding the grip part 30.

In particular, the front nozzle Nf extends along a frontal axis corresponding to the central axis A of the cap 1, substantially at a location corresponding to a centre of the top wall 5. The lateral nozzle Nl extends along a lateral axis perpendicular to the frontal axis, so as to face the outer surface 18 of the skirt 15 substantially at a location corresponding to the groove 23 of the outer surface 18 of the skirt 15.

On FIG. 2, in a molding step, the thermoplastic material, heated to be in a fluid state, is injected through the frontal nozzle Nf into the remaining space of the cavity for molding the body part 2. Once the thermoplastic material has cooled down and rigidified, the body part 2 is formed. The molding elements can then be removed from the cavity.

On FIG. 3, in an overmolding step, the thermoplastic elastomer, heated to be in a fluid state, is injected through the lateral nozzle Nl, in the cavity of the mold in which the boby part 2 remains. The thermoplastic elastomer may fill the groove 23 of the skirt 15 to form the grip part 30. Once the thermoplastic material has cooled down, the mold can be opened and the cap 1 can be removed from the cavity. There could be several lateral injection nozzles Nl and subsequently several injection points on the grip part 30, but in this example, there only one lateral injection nozzle Nl and subsequently only one injection point $30'$ on the grip part 30.

A subsequent folding step can be performed to fold the free end 16 of the skirt 15 inwardly, before the slitting step may take place to form the tamper-evident band 20.

The invention has been disclosed with a cap 1 presenting a symmetry of revolution with a circular top wall 5, an annular skirt 15 of circular cross-section and a corresponding annular grip part 30. The invention is however not limited thereto and the cap 1 could be of any other suitable shape, the top wall 5, the skirt 15 and the grip part 30 being adapted accordingly. Also, although disclosed as extending in a central portion of the skirt 15 on the whole periphery of the outer surface 18 of the skirt 15, any other suitable arrangement of the grip part could be provided. In particular, the grip part 30 could be offset towards the free end 16 or the top wall 5, while not extending on the top wall 5. The grip part 30 could also extend on a part of the periphery of the outer surface 18 of the skirt 15, and especially on at least 30%, preferably at least 50%, of this periphery.

Furthermore, the grip part 30 does not need to be arranged in a groove 23 between bottom 24 and top 25 sides of bottom 21 and top 22 beads. Indeed, the bottom 31 and top 32 edges of the grip part 30 could be defined during the overmolding step through a suitable adaptation of the cavity of the mold.

In this respect, a cap 1' according to a variant of the first embodiment previously disclosed in relation to FIGS. 1 to 3 is represented on FIG. 4.

The cap 1' has a body part 2' with a skirt 15' deprived from the above disclosed top bead 22 and from the above disclosed groove 23. The grip part 30, the shape of which is the same as the previously disclosed one, has a flat bottom edge 31 in contact with the bottom side 24 of the bottom bead 21 and a free curved top edge 32 protruding from the outer surface 18 of the skirt 15'.

The cap 1' according to the variant represented on FIG. 4 also differs from the cap 1 previously disclosed in that the ribs 35' are integral with the grip part 30. Each rib 35' is molded from the same thermoplastic elastomer as that of the grip part 30 with a bottom end 36' connected to the top edge 32 of the grip part 30, and a top end 37' arranged at a distance from the top wall 5.

Additional ribs 40 are provided at the outer periphery of the top wall 5.

The other parts of the cap 1' according to the variant, identical to that of the previously disclosed cap 1 according to the first embodiment, will not be further disclosed in details. Reference is made to the above description for further details.

For manufacturing the cap 1' according to the variant, molding elements complementary to the grip part 30 and the ribs 35' are used during the molding step. After the molding elements have been removed, the overmolding step is performed to form the grip part 30 and the ribs 35' by means of the lateral nozzle Nl facing the outer surface 18 of the skirt 15.

FIG. 5 represents a cap 1" according to a second embodiment of the invention which differs from the cap 1 according to the first embodiment previously disclosed in relation to FIG. 1 in that the grip part 30 is a regular ring having a flat bottom edge 31 and a flat top edge 32 in contact with the top side 25 of the top bead 22, the top edge 32 of the grip part 30 being spaced apart from the top wall 5.

Another difference with the first embodiment is the presence of prominent drop-shaped pads 60, on the outer surface of the grip part 30. These prominent drop-shaped pads 60 are useful to improve the grip of the grip part 30.

The bottom portion 20 of this cap 1" could also be equipped with a temper-proof system as aforedescribed.

This cap 1" also has annularly dispatched parallel ribs 35''', similar to the above described ribs (35, 35') of the first embodiment and its variant, located over the top bead 22 and just beneath the shoulder between the skirt 15 and the top wall 5.

FIG. 6 represents a cap 1''' according to a third embodiment of the invention which differs from the cap 1 & 1" according to the first & second embodiments previously disclosed in relation to FIGS. 1 & 2 in the presence of a location member 45 and in the manufacturing method.

The location member 45, made of the same thermoplastic elastomer as the grip part 30, extends on the outer surface 18 of the skirt 15, parallel to the central axis, from the top edge 32 of one of the narrow portions 34 of the grip part 30, towards the top wall 5. In the illustrated embodiment, an extension of the location member 45 is settled on the outer surface 8 of the top wall 5. The location member 45 may be used to identify an orientation of the cap 1'''.

The other parts of the cap 1''' according to the third embodiment, identical to that of the cap 1 according to the first embodiment previously disclosed in relation to FIG. 1, will not be further disclosed in details. Reference is made to the above description for further details.

For manufacturing the cap 1''' according to the third embodiment, a mold according to a third embodiment having a cavity, molding elements and at least one frontal nozzle analogous to that previously disclosed in relation to FIGS. 2 and 3 can be provided. However, in the mold according to the third embodiment, the lateral axis of the at least one lateral nozzle extends parallel to the frontal axis at the vicinity of the outer surface 18 of the skirt 15. In the illustrated embodiment, the lateral nozzle faces the outer surface 8 of the top wall 5. In other another embodiment, to prevent extension of the location member 45 on the top wall 5, the lateral nozzle could extend tangentially to the outer surface 18 of the skirt 15.

The thermoplastic material can be injected through the frontal nozzle Nf for molding the body part 2. After the molding elements have been removed from the cavity, the thermoplastic elastomer can be injected through the lateral nozzle Nl, in the cavity of the mold in which the boby part 2 remains, for overmolding the grip part 30 onto the outer surface 18 of the skirt and for forming the location member 45. The subsequent folding and slitting steps can then be performed.

A cap 1'''' according to a variant of the third embodiment previously disclosed in relation to FIG. 5 is represented on FIG. 6.

The cap 1'''' according to a variant of the third embodiment has a general structure identical to that of the cap 1' according to the variant of the first embodiment. In particular, as for the cap 1' according to the variant of the first embodiment, the grip part 30 of the cap 1'''' has a free curved top edge 32 protruding from the outer surface 18 of the skirt 15' and from which ribs 35', integral with the grip part 30, extend. Additional ribs 40 are also provided at the outer periphery 6 of the top wall 5. Reference is made to the above description for further details regarding the other parts of the cap 1''''.

However, at the difference of the cap 1' according to the variant of the first embodiment, the cap 1'''' according to the variant of the third embodiment has the above disclosed location member 45 and can be manufactured according the method disclosed in relation to the manufacture of the cap 1''' according to the third embodiment.

The invention claimed is:

1. A cap for closing a container comprising a neck finish delimiting an opening, said cap extending along a central axis and comprising:

a body part molded from a thermoplastic material, said body part including a top wall transverse to the central axis, and a skirt extending around the central axis from the top wall towards a free end, said skirt having an inner surface defining a housing for accommodating the neck finish of the container, and an outer surface opposite to the inner surface, a grip part overmolded at least partly around the central axis, onto a part of the body part, from a thermoplastic elastomer, said thermoplastic elastomer being softer than the thermoplastic material of the body part, wherein the grip part is overmolded only onto a part of the outer surface of the skirt, the grip part being delimited along the central axis by a top edge arranged at a distance from the top wall, and a bottom edge spaced apart from the top edge towards the free end of the skirt;

wherein the grip part has ribs integral therewith, wherein above a bottom portion including the free end, the outer surface of the skirt has an annular bottom bead around the central axis, the bottom edge of the grip part being spaced apart from the free end of the skirt, the bottom edge being in contact with the bottom bead, the ribs having a thickness, measured radially with respect to the central axis, corresponding to a thickness, measured radially with respect to the central axis, of the annular bottom bead.

2. The cap according to claim 1, wherein the outer surface of the skirt has a periphery about the central axis, the grip part extending on at least 30%, of the periphery of the outer surface of the skirt.

3. The cap according to claim 2, wherein the grip part extends on at least 50% of the periphery of the outer surface of the skirt.

4. The cap according to claim 2, wherein the grip part extends on the whole periphery of the outer surface of the skirt.

5. The cap according to claim 1, wherein the grip part comprises gripping portions equally distributed around the central axis.

6. The cap according to claim 5, wherein the grip part comprises enlarged portions forming the gripping portions, and narrower portions connecting two adjacent gripping portions.

7. The cap according to claim 6, wherein the bottom edge of the grip part is substantially flat and the top edge of the grip part is curved so as to define the gripping portions extending from the bottom edge, and the narrow portions.

8. The cap according to claim 1, wherein the ribs extend parallel to the central axis on the outer surface of the skirt, between the top edge of the grip part and the top wall.

9. The cap according to claim 1, wherein each rib has a bottom end at the vicinity of the top edge of the grip part, and a top end opposite to the bottom end, the top end being arranged at a distance from the top wall.

10. The cap according to claim 1, wherein the bottom edge of the grip part is spaced apart from the free end of the skirt.

11. The cap according to claim 1, wherein thermoplastic material of the body part is a polyolefin.

12. The cap according to claim 1, wherein thermoplastic material of the body part is a polyethylene.

13. The cap according to claim 1, wherein thermoplastic material of the body part is a polypropylene.

14. The cap according to claim 1, wherein thermoplastic material of the body part is from high density polyethylene.

15. A method for manufacturing a cap according to claim 1, comprising the steps of:

molding, in a cavity of a mold, the body part from a thermoplastic material, overmolding, in the cavity of the mold, the grip part at least partly around the central axis, only onto a part of the outer surface of the skirt, from a thermoplastic elastomer, said thermoplastic elastomer being softer than the thermoplastic material of the body part.

16. The method according to claim 15, wherein the step of molding the body part comprises injecting the thermoplastic material along a frontal axis coaxial to the central axis of the cap, through a frontal nozzle opening in the cavity of the mold, and the step of overmolding the grip part comprises injecting the thermoplastic elastomer along a lateral axis perpendicular to the frontal axis, through a lateral nozzle opening into the cavity so as to face the outer surface of the skirt.

17. The method for making a cap according to claim 15, wherein:

at the step of molding the body part, the cavity is provided with molding elements complementary to the grip part, and before the step of overmolding the grip part, the molding elements are removed from the cavity.

* * * * *